(12) United States Patent
Thielbar et al.

(10) Patent No.: US 11,541,319 B2
(45) Date of Patent: Jan. 3, 2023

(54) SYSTEM AND METHOD FOR FILTERING STREAM CHATS

(71) Applicant: Sony Interactive Entertainment LLC, San Mateo, CA (US)

(72) Inventors: Christopher Thielbar, San Francisco, CA (US); Matthew Bloom-Calin, San Francisco, CA (US); Yuji Tsuchikawa, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/299,056

(22) Filed: Mar. 11, 2019

(65) Prior Publication Data
US 2020/0289946 A1    Sep. 17, 2020

(51) Int. Cl.
G06F 16/9035    (2019.01)
A63F 13/87     (2014.01)
G06F 16/9032    (2019.01)

(52) U.S. Cl.
CPC .......... *A63F 13/87* (2014.09); *G06F 16/9035* (2019.01); *G06F 16/90328* (2019.01)

(58) Field of Classification Search
CPC . A63F 13/87; G06F 16/90328; G06F 16/9035
See application file for complete search history.

(56) References Cited

U.S. PATENT DOCUMENTS 9,413,700 B1    8/2016  Jerrard-Dunne et al.
10,182,024 B1*  1/2019  Chung .................... H04L 47/00
2009/0164904 A1* 6/2009  Horowitz ............. G11B 27/034
                                            715/723
2009/0286604 A1* 11/2009 Clowes .................. A63F 13/12
                                            463/42
2012/0185291 A1* 7/2012  Ramaswamy ..... G06Q 10/1095
                                            705/7.19
2013/0046828 A1    2/2013  Grewal et al.
(Continued)

FOREIGN PATENT DOCUMENTS

CN     108243018        7/2018
WO     WO 2020/185358   9/2020

OTHER PUBLICATIONS

PCT/US20/18612, System and Method for Filtering Stream Chats, Feb. 18, 2020.
(Continued)

*Primary Examiner* — John A Follansbee
*Assistant Examiner* — Raqiul A Choudhury
(74) *Attorney, Agent, or Firm* — Polsinelli PC

(57) ABSTRACT

The subject disclosure relates to filtering stream chat messages. In some aspects, a process of the disclosed technology can include operations for receiving messages from a plurality of user accounts, detecting a section trigger indicating one or more filtering attributes, and filtering messages based on the filtering attribute. In some aspects, the process can further include operations for creating a section, adding one or more users to it and generating a section level, where the section level and messages associated with it are displayed to the added users. Systems and machine-readable media are also provided.

27 Claims, 6 Drawing Sheets

(56) References Cited

U.S. PATENT DOCUMENTS

| | | | |
|---|---|---|---|
| 2013/0227086 A1* | 8/2013 | Stout | G06F 16/9535 |
| | | | 709/219 |
| 2013/0239021 A1 | 9/2013 | Feinberg et al. | |
| 2013/0244743 A1 | 9/2013 | Barclay et al. | |
| 2016/0236097 A1* | 8/2016 | Sullivan | A63F 13/424 |
| 2016/0286244 A1* | 9/2016 | Chang | H04N 21/21805 |
| 2017/0032021 A1 | 2/2017 | Watanachote | |
| 2018/0139257 A1* | 5/2018 | Ninoles | H04L 65/4076 |

OTHER PUBLICATIONS

PCT Application No. PCT/US2020/018612 International Search Report and Written Opinion dated May 6, 2020.

* cited by examiner

SYSTEM AND METHOD FOR FILTERING STREAM CHATS

BACKGROUND OF THE INVENTION

Field of the Invention

The present technology pertains to filtering stream chat messages. More specifically, the present technology provides for sectioning an aggregate of messages in a stream chat based on filtering attributes.

Description of the Related Art

Digital content streams are presently available from a variety of different content providers. For example, computer games, such as video games, have become a popular source of entertainment. Computer games are a type of computer simulation and are typically implemented in computer game software applications and are often run on game consoles, entertainment systems, desktop, laptop, and notebook computers, portable devices, tablet and pad-like devices, etc. An online game is a type of computer game or simulation played over a computer network, typically the Internet.

A multiplayer computer simulation, such as a multiplayer computer game, allows more than one player to participate in the simulation. Such multiplayer computer simulations are often conducted online so that players in geographically diverse locations can participate. Many multiplayer computer simulations involve different types of groups of players, competing, or otherwise interacting with each other.

The continued evolution and growth of online gaming has led to a rise in popularity of video game spectating, or virtual spectating. Spectator gaming has emerged as a popular paradigm for online multiplayer gaming. Spectating makes it possible for spectators to watch live or recorded broadcasts of a person playing a video game and chat about it with other spectators. The number of spectators can be in the thousands or more. The gaming stream is delivered to a large, dynamic, and heterogeneous population of spectators. In some cases, the players themselves may also engage in spectating (in relation to other players and teams), chat, and other interactions related to game sessions.

For example, in a multiplayer online game, spectators may watch one or more players or teams of players participating in game play. Broadband Internet, high-resolution video, and video streaming technologies have led to the development of live and recorded broadcasting technologies that may be leveraged to provide online virtual spectating for online games. For example, a game spectating system may allow players to broadcast live or recorded streams of their game play to tens, hundreds, or thousands of spectators, while allowing the spectators to select the live or recorded broadcasts of particular players for viewing.

Individual spectators express their thoughts through text, often responding to what is happening in the game. A chat box used in a session that involves numerous individuals may be constantly updated with messages from chat participants, eventually descending into chaos. For streams with massive audiences and large amounts of chatting spectators, a chat message may be lost among numerous other messages and conversational threads and/or lose all context, thereby making it difficult for chat participants to have coherent conversations.

There is a need for a more organized chat section that groups chat participants based on the commonalities in their messages, all while allowing the chat participant to participate in the larger chat discussion.

SUMMARY OF THE PRESENTLY CLAIMED INVENTION

Embodiments of the present invention include systems and methods for filtering stream chat messages. The method enables users participating in a larger chat stream to be assigned to a smaller chat stream based on certain attributes gathered from their messages in the larger chat stream. A plurality of messages is received from a chat stream, and certain filtering attributes are created based on the messages. The filtering attributes are used to create a section in response to a request indicating certain set of filtering attribute.

Various embodiments may include methods for filtering stream chat messages. Such methods may include receiving one or more messages from a plurality of user accounts. The messages are aggregated for display in an aggregated level of the chat session. Such methods may include detecting a section trigger associated with one or more filtering attributes, filtering the aggregated messages based on the filtering attributes, identifying a subset of the aggregated messages as meeting one or more filtering attributes, creating a section associated with the chat session, adding one or more user accounts to the created section, including subsequent messages from the added accounts in the filtered subset, and generating a display of the section level accessible to the added accounts that includes the filtered subset corresponding to one or more filtering attributes. Such methods may further include displaying a new message from one of the added user accounts in the section level accessible to the other added user accounts.

A still further aspect of the present invention is directed to a system that implements the steps of the method discussed above. The system includes a processor and memory for storing machine instructions executed by the processor to implement functions to perform filtering stream chat messages. The system includes a network interface that receives one or more messages from a chat session associated with a stream and detect a section trigger associated with one or more filtering attributes.

Further embodiments include non-transitory computer-readable storage media having embodied thereon a program executable by a processor to perform the steps of filtering stream chat messages.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for filtering stream chat messages. A user may participate in a stream chat displayed in an aggregated level of a chat session by sending messages in the stream chat. The aggregated messages in the aggregated level may be filtered based on one or more filtering attributes. A subset of the aggregated messages may be identified as meeting the filtering attributes, and a section may be created based on the filtering attributes so as to display the subset of messages. The subset of messages identified for the section may be displayed in a section level, and user accounts may be added to the section based on relationship to the identified subset. The users associated with the user accounts may thereafter view messages for display in the section level and may vote to have messages sent as a group to the aggregated level.

Figure 1:
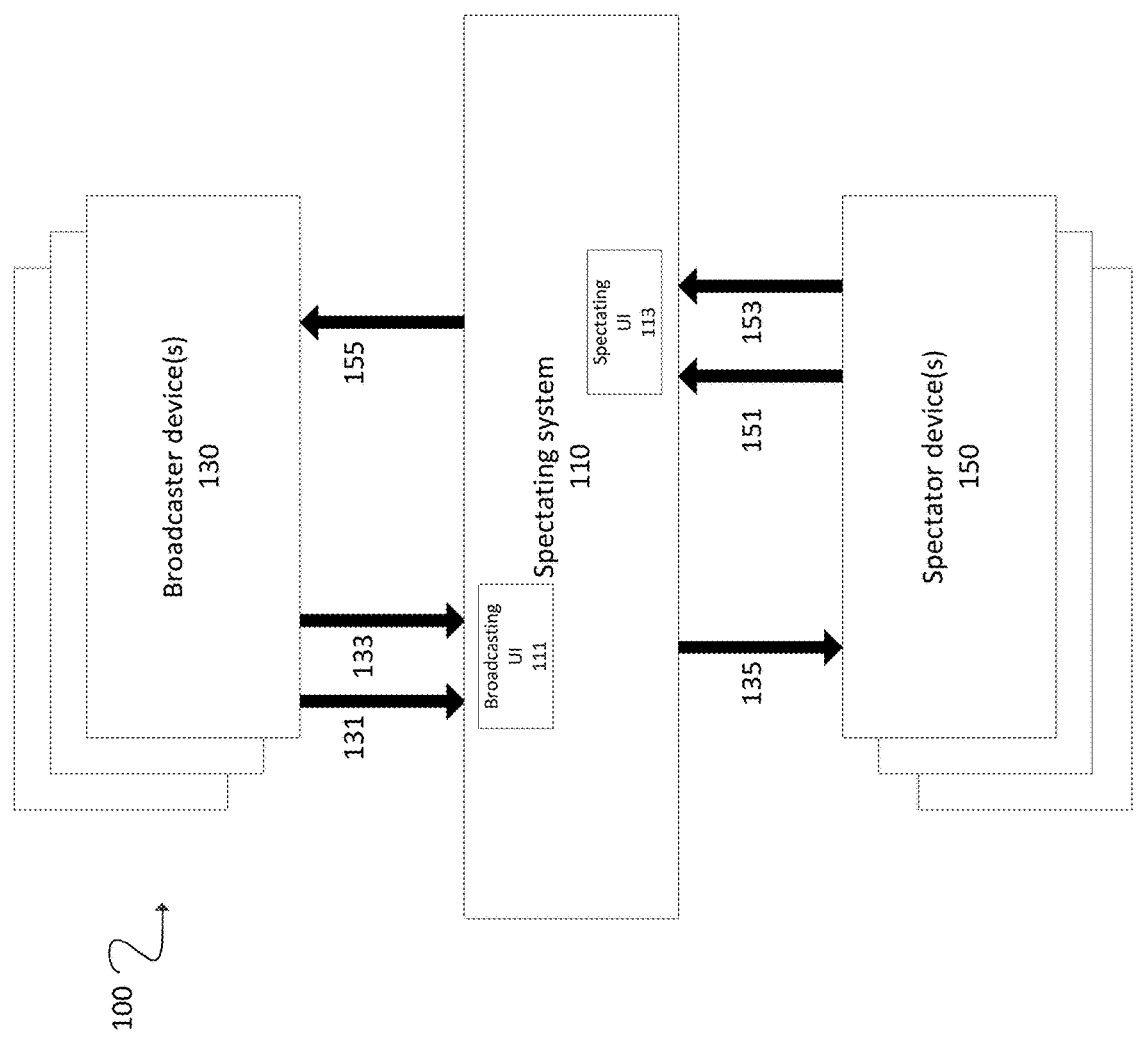
FIG. 1 illustrates an exemplary network environment in which a system for filtering stream chat messages may be implemented.

FIG. 1 illustrates an exemplary network environment 100 in which a system for filtering stream chat messages can be implemented. The network environment 100 may include a spectating system 110 and multiple client devices that may include broadcaster devices 130 (e.g., associated with content providers of content streams) and spectator devices 150.

Client devices, such as broadcaster devices 130 and spectator devices 150, may include any of a variety of consumer devices including desktop computer systems, laptop/notebook computer systems, pad/tablet devices, smartphone devices, game consoles, handheld gaming devices, and wearable devices. A client device may implement an operating system (OS) platform that is compatible with the device. A client device may include, but is not limited to, input and output components and client software. The client software on a particular client device may be tailored to support the configuration and capabilities of the particular device type and the OS platform of the device.

A broadcaster device 130 may include input and output components, such as input devices and technologies such as controllers or joysticks, motion tracking systems, and gesture-based input systems, and game client software and/or hardware. A broadcaster device 130 may also include input and output components and broadcasting client software and/or hardware for the spectating system 110 via which respective content providers may generate AN streams for broadcast (e.g., broadcast stream 131) on a live or prerecorded basis. In some embodiments, broadcast streams 131 may be integrated or otherwise associated with other broadcaster input 133, such as embedded audio, textual, video, commentary, etc. that may be provided as part of or in association with the broadcast streams 135 provided to spectator devices 150 via the spectating system 110. In some instances, broadcaster device 130 may be associated with servers and databases for hosting and processing broadcast streams 135.

A spectator device 150 may include input and output components and spectating client software and/or hardware via which respective spectators may interact with the spectating system 110 to select, receive, and view live or recorded broadcast streams 135 from the broadcasters or playbacks of previously recorded broadcasts. The spectators may also provide spectator inputs 151, including but not limited to audio, textual, or other interactive chat messages for engaging with the broadcast stream 135 and other spectator interaction data 153 regarding the broadcast content 135. In some embodiments, spectator inputs 151 may also include inputs from input devices and technologies such as controllers or joysticks, motion tracking systems, gesture-based input systems, and so on.

In some embodiments, spectating system 110 may include one or more computing devices, such as one or more server devices that implement spectating and chat functionality. In some embodiments, spectating system 110 may be a network-based video streaming system or service that may allow players and other content providers to broadcast live or recorded streams 135 to tens, hundreds, thousands, or more spectators, while allowing the spectators to select specific broadcast streams 135 to view and engage with. A spectating system 110 may support live or recorded streaming of broadcast streams 135 from one or more broadcaster devices 130 to the spectator devices 150. In some embodiments, a spectating system 110 may distribute at least some broadcast streams 135 to an audience of multiple spectator devices 150. A spectating system 110 may support live and recorded broadcast streams 135 for one, two, or more different online games.

In some embodiments, spectating system 110 may also include or access other devices, services, or systems including but not limited to storage devices, systems, or services for storing profile, preferences, and other information for participants, recordings of broadcast stream 131, and game spectating data. In some embodiments, spectating system 110 may store recordings of at least some broadcast streams 131 to a data store, and may allow spectators to select and play back the recordings via spectating client software on the spectator devices 150.

In some embodiments, spectating system 110 may implement one or more user interfaces (UI) to the spectating system 110 functionality. For example, spectating system 110 may implement a broadcasting UI 111 that broadcasters may access via broadcaster devices 130 to broadcast stream 131 their live or recorded game play and other input 133 such as video input and audio or textual commentary or chat. As another example, spectating system 110 may implement a spectating UI 113 that spectators may access via spectator devices 150 to select, receive, and view live or recorded broadcast stream 131 from the broadcasters or playbacks of previously recorded broadcast stream 131, and via which the spectators may provide spectator input 151 for broadcast stream 131 in reaction or other interaction with broadcast content 155 provided by the spectating system 110. For example, spectator input 151 may include audio or textual commentary or chat for broadcast streams 135, as well as actions and selections made in relation to the broadcast stream 135.

In some embodiments, a spectating system 110 may support broadcasts of live and/or recorded digital media content via broadcaster devices. In some embodiments, the spectating system 110 may support live or recorded broadcast streams 131 from sports games, competitions, concerts, and other events including but not limited to live or recorded streams from electronic spectator sports (eSports) competitions. eSports generally refers to digital game competitions, often involving multiple players playing various matches. Such matches may be recorded from each player point-of-view via the respective player device—which may serve as a broadcaster device 130—and streamed via spectating system 110 to spectator devices 150. In some instances where the matches are played in-person, video cameras and audio equipment may be installed in an arena or other venue where competition is being held to capture content for integration into and production of broadcast streams 131. Video and/or audio feeds from such equipment may be input to one or more broadcaster devices 120 that may composite and otherwise process the broadcast stream to the spectating system 110. Other types of related data (e.g., hyperlinks, metadata, related fan content) may also be added to the broadcast stream 131, along with the feeds from the cameras and audio equipment.

In some embodiments, commentators and/or broadcasters may input their audio, text, and/or video content into a stream, thereby generated a new version of the broadcast stream 135 in which the inputted content is incorporated with an underlying broadcast stream 131. Spectator devices 150 may access the broadcast stream 131, which may be the subject of engagement with content and with other spectators.

In an exemplary implementation, spectating system 110 may also support chat functionality that allows multiple spectator devices 150 (each associated with a different user as identified by reference to a user account) to communicate with each other. Spectating system 100 may receive one or more messages from a plurality of user accounts participating in a chat session associated with a specific live or recorded stream. Such messages may be aggregated for display in an aggregated level of the chat session.

In some embodiments, a section trigger may be detected by spectating system 110 in association with one or more filtering attributes for a new section. Such trigger may include a request originating from one of the spectator devices 150 (e.g., from a spectator of the broadcast stream 135), a broadcaster device 130 (e.g., from an administrator for a specific audience), a player device (e.g., for a specific fanbase), or others. In some embodiments, the section trigger may be detected and a section level automatically generated based on predetermined conditions associated with the broadcast stream 1351. For example, a content producer or provider may specify that when an audience meets a certain threshold size, that sections be created to allow for more coherent conversations among smaller groups of spectator devices 150; and as a section is filled and the audience keeps growing, additional sections may be added. Such sections may further be based on user profile information, which may include such parameters as common language, common interests, age range (and associated parental restrictions), geographic regions, and other grouping parameters known in the art. Different section levels may be created for different fanbases, for example, as well as different characteristics of the user account. In some embodiments, section triggers may further be based on analysis of the aggregated chat to identify trends, players of interest, and keywords that may be used as a basis for filtering.

In response to detection of such a section trigger, spectating system 110 may filter the aggregated messages to identify a subset of the aggregated messages as meeting the one or more filtering attributes. As noted above, such filtering attributes may be based on an analysis of the aggregated chat messages, as well as the user accounts that originated the same. Exemplary filtering attributes may include subject matter, timeframe when message is received, references to specific events or other users, social circles, tags, hashtags, etc. A section level may thereafter be created and associated with the chat session, and one or more user accounts identified as having originated the subset of messages may be added to the created section level. When a user account is added to a section level, subsequent and new messages from that added user account may be automatically included in the filtered subset, which may be displayed in a generated section level (associated with the aggregated level of the chat session for the broadcast stream 131) that is accessible to the added user accounts. In some embodiments, the section level may further allow the added user accounts to communicate private messages with the other added user accounts within the section level.

Users may further be allowed to join or leave a section level, as well as be removed from a section level (e.g., for violating rules associated with the section level). Such section level may be displayed as a window, overlay, or other type of display that may be associated with the chat session (and aggregated level thereof). Each user in a section may further switch between views of the section level (with its filtered subset of messages) and the aggregated level (with the aggregated set of messages) in the chat session.

In some embodiments, a section level allows its members to vote on section-wide actions, such as coordinated group messages, cheers, or a virtual "wave". The section level may therefore track votes from the added user accounts, and when the vote total reaches a predetermined threshold level or proportion, the associated action may be performed or otherwise visually indicated in the section level and aggregated level of the chat session for the broadcast stream 131.

Figure 2:
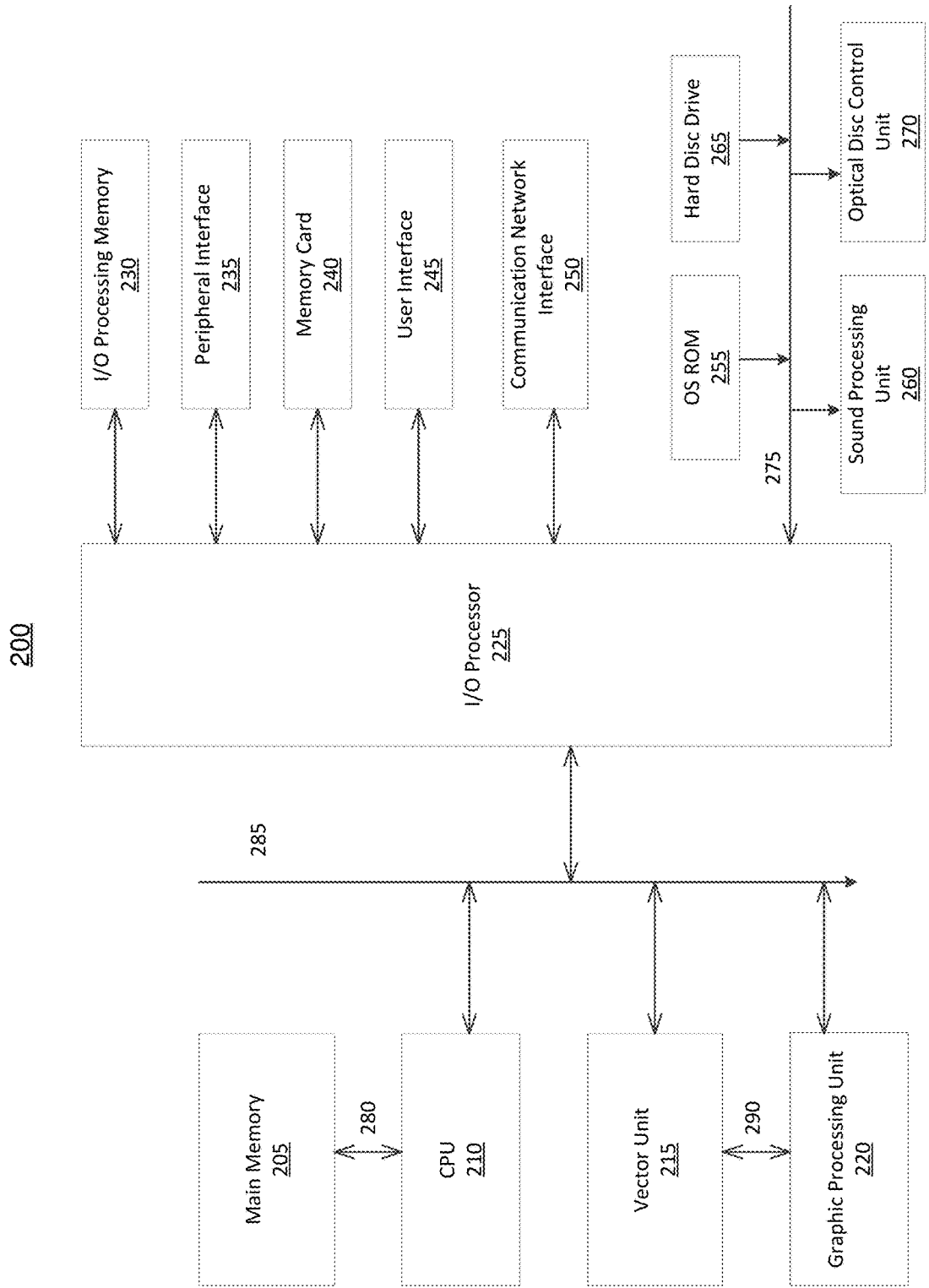
FIG. 2 illustrates an exemplary electronic entertainment system that may implement filtering stream chat messages.

FIG. 2 illustrates an example of an electronic entertainment system 200 that may implement the subject technology. The entertainment system 200 of FIG. 2 includes a main memory 205, a central processing unit (CPU) 210, vector unit 215, a graphics processing unit 220, an input/output (I/O) processor 225, an I/O processor memory 230, a peripheral interface 235, a memory card 240, a Universal Serial Bus (USB) interface 245, and a communication network interface 250. The entertainment system 200 further includes an operating system read-only memory (OS ROM) 255, a sound processing unit 260, an optical disc control unit 270, and a hard disc drive 265, which are connected via a bus 275 to the I/O processor 225.

Entertainment system 200 may be an electronic game console. Alternatively, the entertainment system 200 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

Figure 4:
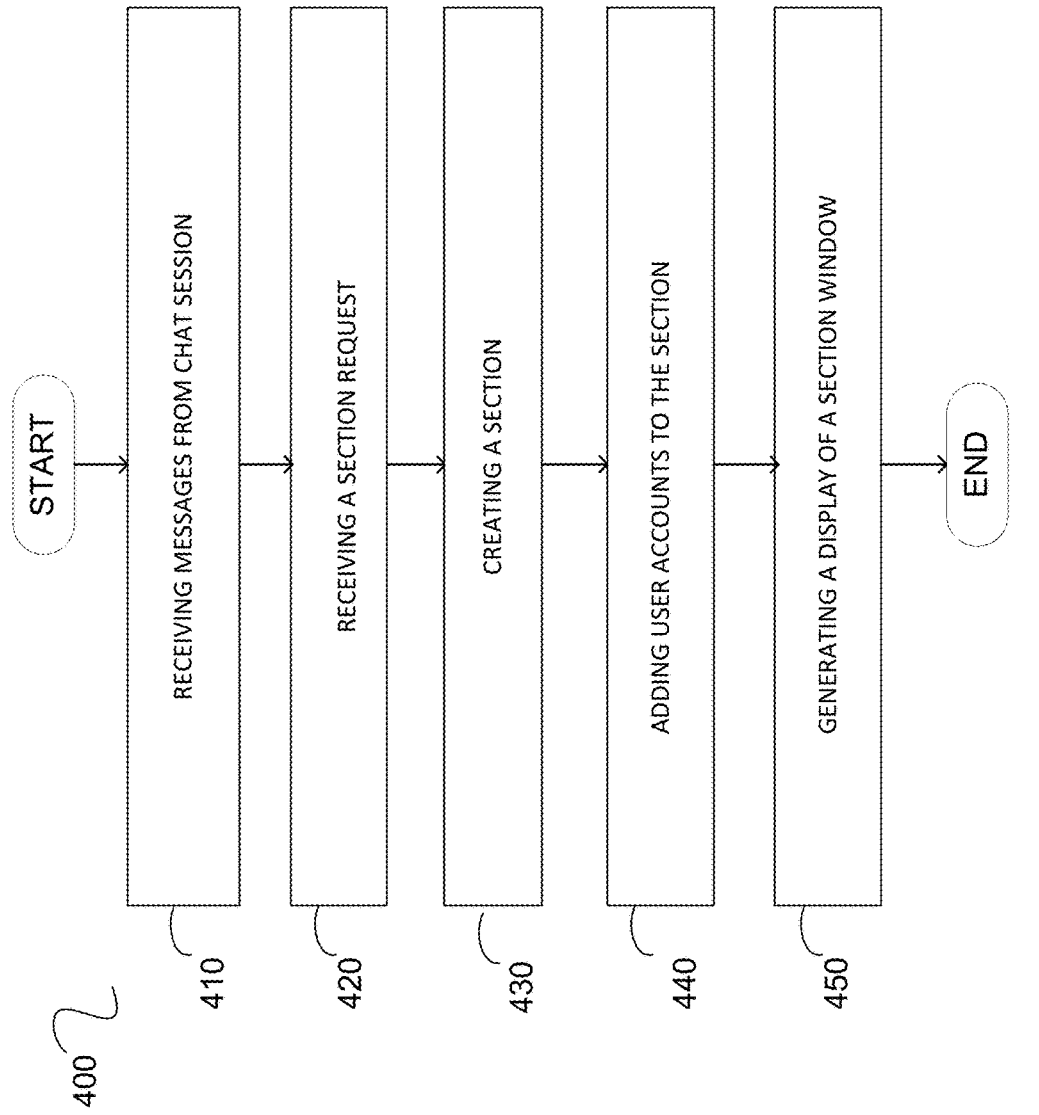
FIG. 4 is a flowchart illustrating an exemplary method for filtering stream chats.

The CPU 210, the vector unit 215, the graphics processing unit 220, and the I/O processor 225 of FIG. 4 communicate via a system bus 285. Further, the CPU 210 of FIG. 2 communicates with the main memory 205 via a dedicated bus 280, while the vector unit 215 and the graphics processing unit 220 may communicate through a dedicated bus 290. The CPU 210 of FIG. 2 executes programs stored in the OS ROM 255 and the main memory 205. The main memory 205 of FIG. 4 may contain pre-stored programs and programs transferred through the I/O Processor 225 from a CD-ROM, DVD-ROM, or other optical disc (not shown) using the optical disc control unit 270. I/O Processor 225 of FIG. 2 may also allow for the introduction of content transferred over a wireless or other communications network (e.g., 4G, LTE, 1G, and so forth). The I/O processor 225 of FIG. 2 primarily controls data exchanges between the various devices of the entertainment system 200 including the CPU 210, the vector unit 215, the graphics processing unit 220, and the peripheral interface 235.

The graphics processing unit 220 of FIG. 2 executes graphics instructions received from the CPU 210 and the vector unit 215 to produce images for display on a display device (not shown). For example, the vector unit 215 of FIG. 2 may transform objects from three-dimensional coordinates to two-dimensional coordinates, and send the two-dimensional coordinates to the graphics processing unit 220. Furthermore, the sound processing unit 260 executes instructions to produce sound signals that are outputted to an audio device such as speakers (not shown). Other devices may be connected to the entertainment system 200 via the USB interface 245, and the communication network interface 250 such as wireless transceivers, which may also be embedded in the system 200 or as a part of some other component such as a processor.

The communication network interface 250 is configured to transmit and receive data over a network. The network can include one or more wired and/or wireless networks. Further, multiple communication network interfaces 250 may be used to engage with various communications network types. For example, multiple network interfaces may be employed to allow for the communication over broadcast, multicast, and/or unicast networks.

A user of the entertainment system 200 of FIG. 2 provides instructions via the peripheral interface 235 to the CPU 210, which allows for use of a variety of different available peripheral devices (e.g., controllers) known in the art. For example, the user may instruct the CPU 210 to store certain game information on the memory card 240 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

Figure 3:
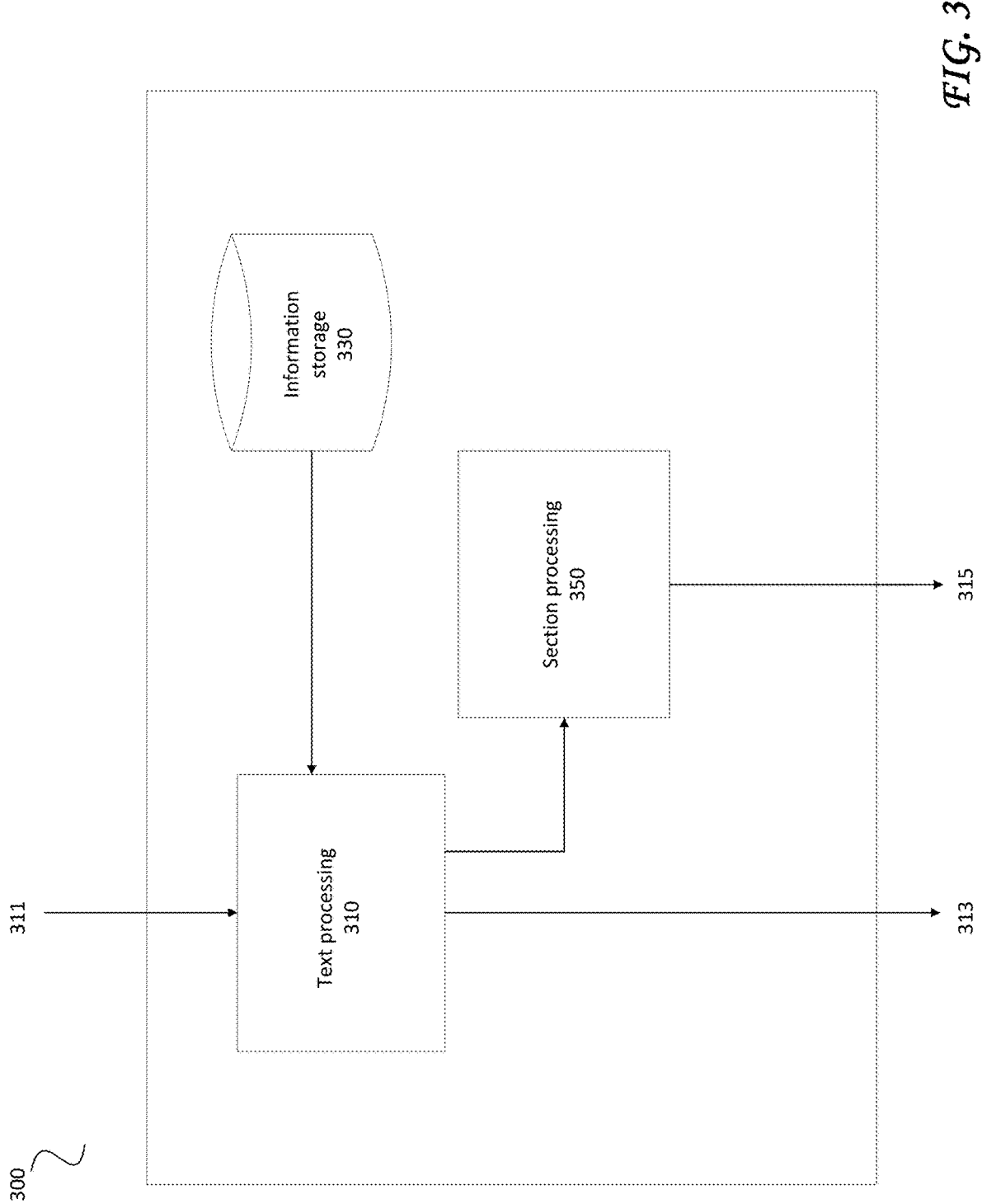
FIG. 3 is a diagram illustrating an exemplary flow of information used to determine and process the filtered stream chat messages.

FIG. 3 is a diagram 300 illustrating an exemplary flow of information used to determine and process the filtered stream chat messages. Diagram 300 illustrates information flowing between system components that may include or have access to a text processing 310 module, information storage 330, and section processing 350. Online games and game spectating systems may support text input/output and communications for game players and for game spectators. For example, players in online games may communicate game play commands, suggestions, comments, strategy, or other information to other players on their team or another team (e.g., trash talk) within the game session via text input to an in-game chat session. Players may also interact with family, friends, and fans in the spectator audience via a chat functionality associated with the broadcast stream 131. As another example, broadcasters (e.g., via broadcaster device 130) and spectators (e.g., via spectator devices 150) may participate in a chat session associated with a particular broadcast stream 131 in a network environment 100. In some embodiments, text processing 310 module may parse the text from one or more sources associated with a broadcast stream 131 to identify and extract words, phrases, or other content from written and verbal communications, images (e.g., GIFs), and other content that may be inputted by chat participants. In some embodiments, the spectating system 110 may instead or also include one or more interfaces that can obtain, process, and analyze text inputs from other input sources or channels, including but not limited to inputs from social media channels, such as "tweets" or instant messaging (IMs). In some embodiments, text processing 310 module may analyze the extracted text content to detect commonalities. For example, the text processing 310 module may try to match keywords or phrases that recur within the chat session associated with a broadcast stream 131. Such keywords or phrases may be indicative of certain events in game play, specific players or teams, particular commentators, or specific other participants.

In some embodiments, text processing 310 module may provide the extracted content to a section processing 350 module, which performs analysis of the extracted content to create a section based on message content that meet a set of filtering attributes. Section processing 350 module may receive content (e.g., words and/or phrases) extracted from audio/voice and/or text in a chat session specific to the broadcast stream 131), and may analyze the received content to content to create a section based on the filtering attributes. For example, the section processing 350 module may try to match keywords or phrases (e.g., "Go LA!") from the extracted content to players, teams, commentators, and other participants in the same geographic region or who have expressed interest in the same area players and teams.

In some embodiments, section processing 350 module may access one or more information storage 330 sources to search data sets of keywords or phrases associated with particular genres, games, broadcasters, and so on; the data sets may map the keywords to particular events or types of events of interest that may be considered as significant or notable events or highlights in broadcasts.

In some embodiments, participant chat input 311 may include, but are not limited to, audio, video, and text inputs to the spectating system 110 via a spectating UI 113. In some embodiments, participant chat inputs 311 also include inputs from input devices and technologies coupled to or included in spectator devices 150 inclusive of controllers or joysticks, motion tracking systems, gesture-based input systems, and so on that can be analyzed and used to generate main chat information 313 and section chat information 315. In some embodiments, the spectating system 110 may include one or more interfaces that can obtain and process inputs from other input sources or channels, including but not limited to inputs from social media, such as "tweets" or IMs; and the inputs to the other input channels may be similarly analyzed to generate main chat information 313 for display in an aggregated chat session level and section chat information 315 for display in a section chat level.

Another example of filtering section chat information 315 from main chat information 313 in a spectating session may be based on analysis of the audio and/or text chat inputs 311 for spectators viewing a player's broadcast (e.g., a particularly popular or famous player), which may indicate that the player/broadcaster has a specific audience of spectators and/or is a spectator favorite when compared to other players in the game.

The main chat information 313 and section chat information 315 within a spectating session may further be analyzed to identify particular matches of interest, for example games for which activity is currently "hot" or interesting according to the "crowd noise" or other chat activity for a broadcast stream of the current match. In some embodiments, the identified streams of interest may then be indicated on at least some of the spectator devices, for example, by highlighting or otherwise designating the stream link on the spectating UI 113.

FIG. 4 is a flowchart illustrating an exemplary method for filtering stream chats. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method.

The present method filters stream chats into sections based on filtering attributes. The chat sections can be based on processing performed on text information by detecting common attributes among the various kinds of information to use as filtering attributes for a section. Similarly, the chat sections can be based on processing performed on stored information, attributes previously defined and stored in relation to the same or related broadcast stream 131 (e.g., used for matches in the same tournament or same game title), to detect common attributes between previously stored filtering attributes and text information.

At step 410, one or more messages from a plurality of user accounts are received by the communication network interface 250. Such messages may be aggregated for display in an aggregated level. Such messages may be displayed in an aggregated chat level associated with the broadcast stream 131 being accessed by the plurality of user accounts. The messages can be related to a live or recorded broadcast of a match, previously recorded broadcast of a match, and other stream-related content.

At step 420, a section trigger associated with one or more filtering attributes is detected by the communication network interface 250. The filtering attributes are based on commonalities of content among the one or more messages from the plurality of user accounts (e.g., experience, interests, etc.).

At step 430, the processor 225 creates a section based on the section trigger and filters the messages based on the one or more filtering attributes of the section trigger. The filtered messages are identified as a subset of the aggregated messages, and the subset is displayed in a section level. The user accounts matching the subset of the aggregated messages are selected to be added to the chat section.

At step 440, the processor 225 adds user accounts that meet one or more of the filtering attributes to the section. Such match may be based on determined metrics from the one or messages, such as keywords or phrases. Any message sent by a particular user subsequent to being added to a particular chat section will be included in the filtered subset.

At step 450, the processor 225 generates a display of a section level that is accessible to the created section for the added user accounts. The displayed chat section level can include the messages already in the filtered subset. The displayed chat section can further include one or more new messages from the added user accounts. The displayed chat level can only be accessible to the added user accounts.

In some embodiments, user accounts within a section can submit votes to send a specific message to the aggregated level of the chat session. The section level tracks the votes and tracks the action to be taken in the aggregated level, also called "stadium level." The action is sent to the aggregated level and is identified by the particular chat section from which it is sent.

After the selected activity is completed, the section chat level may remain intact for as long as user accounts are participating or may remain intact even if the user accounts stop participating in it. In situations in which the methods described herein automatically add users to a chat section, the users can be provided with an opportunity to control the conditions under which each user account is added to a chat section. The user may be presented with an invitation to join the created chat section, for example, and can decline or otherwise opt out of section participation. A user may choose to be removed from the chat section. In additional embodiments, a user may create a chat section for private messages with other users.

Figure 5:
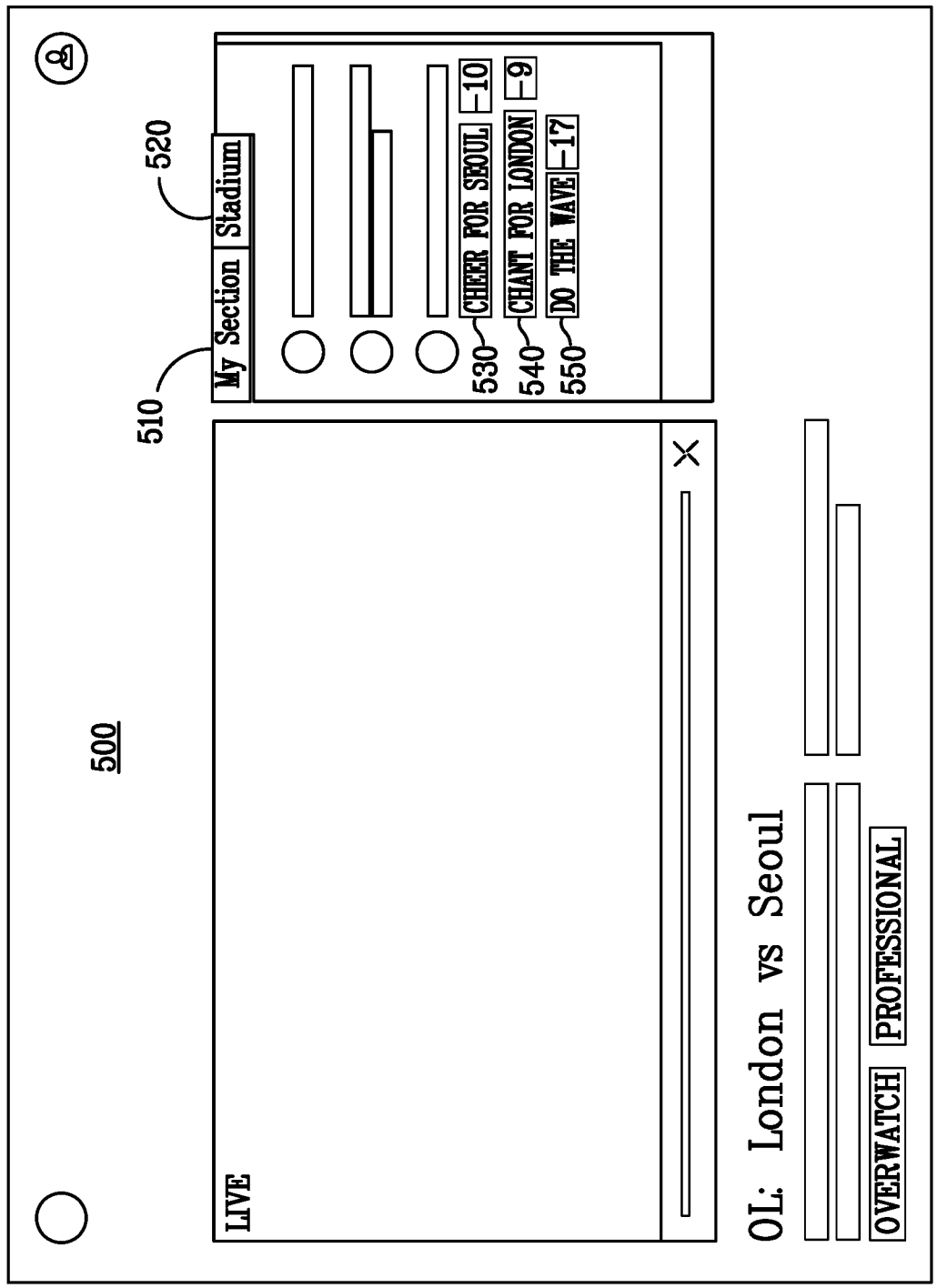
FIG. 5 illustrates a screenshot of a graphical user interface for a section level used in systems for filtering stream chat messages.

FIG. 5 illustrates a screenshot of a graphical user interface 500 for a section level used in systems for filtering stream chat messages. Graphical user interface 500 is an exemplary embodiment of a graphical user interface presented to a user who is participating in a stream chat. The graphical user interface 500 can be configured to provide a section chat level associated with a broadcast stream 131 to a user device 150 (associated with a user account). When a user account is added to a chat section based on certain filtering attributes that meet the user's messages in the stream chat, the graphical user interface 500 can be configured to display to a user the chat section 510. The graphical user interface 500 can include content that is shared by a spectator or other user or player. Some user accounts may be associated with multiple section chat levels where, for example, the user has expressed interest in multiple topics, players, teams, or other elements of the broadcast stream 131.

In some embodiments, the graphical user interface 500 will display the votes accumulated by the users in a chat section to take certain actions in the "stadium level" 520. For example, a one or more users can vote to "cheer" 530 for a certain team or player, one or more users can vote to "chant" 540 for a certain team or player, one or more users can vote to "do the wave" 550.

Figure 6:
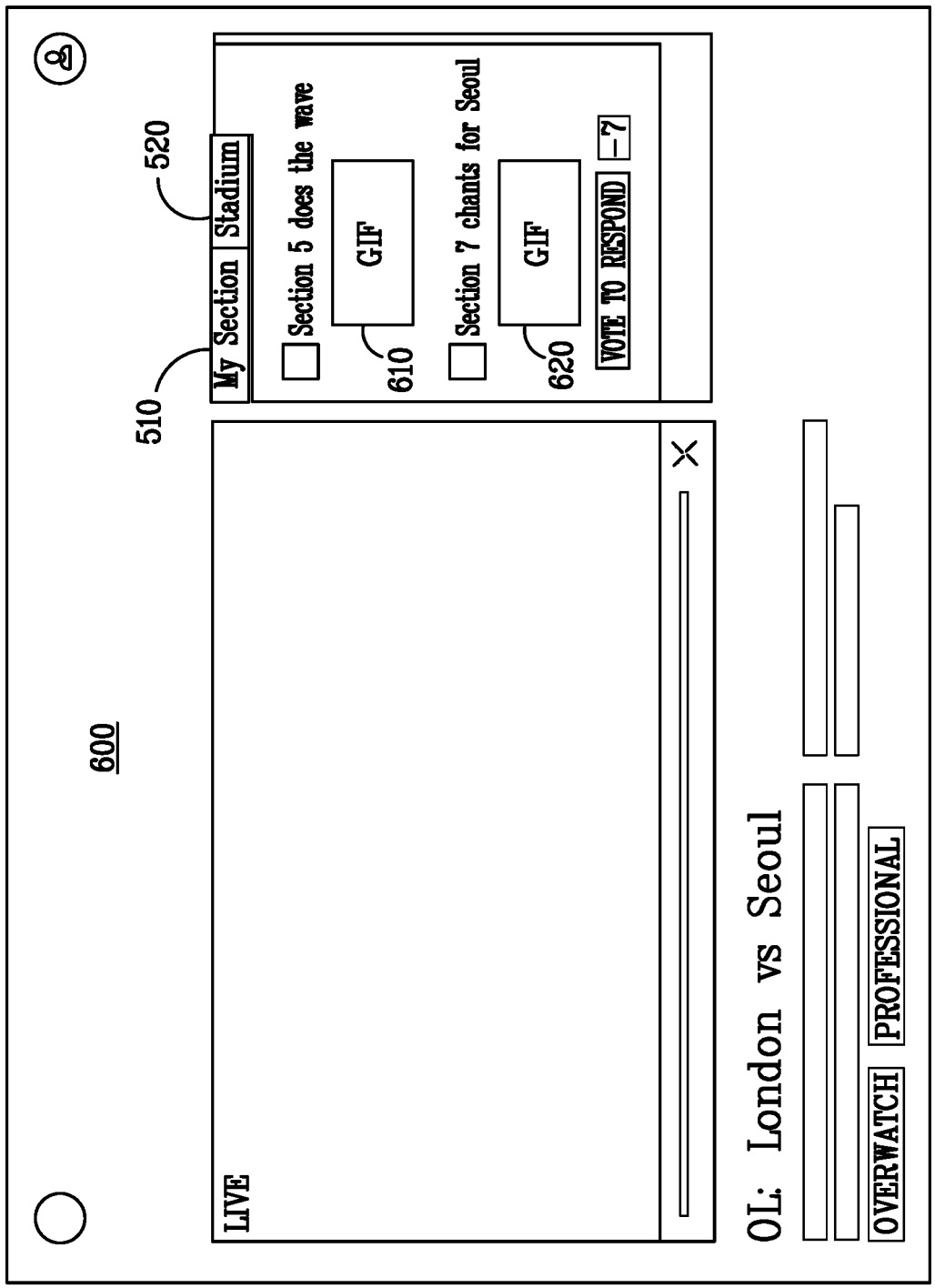
FIG. 6 illustrates a screenshot of another graphical user interface for an aggregated chat session level used in systems for filtering stream chat messages.

FIG. 6 illustrates a screenshot of another graphical user interface 600 for an aggregated chat session level used in systems for filtering stream chat messages. The graphical user interface 600 can be configured to display to a user an aggregated level of a chat stream. In some embodiments, such graphical user interface 600 may be in the form of a "stadium level" that displays actions 610 by different chat sections (e.g., different team cheers or jeers). The "stadium level" can be the aggregated level as described above.

The graphical user interfaces 500 and 600 allow a particular user to switch between aggregated chat levels and section chat levels. The expressions of each individual section can replicate any kind of crowd level interactions, including but not limited to waves and chants. For example, if one or more users from a particular section votes in that section to "chant" for a certain team or player it will be displayed in the "stadium level" 520. Actions taken by a section at the "stadium level" are aggregated in the "stadium level." Examples can include "section 5 does the wave!" 610 and "section 7 chants for Seoul!" 620.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for filtering stream chat messages, the method comprising:
   storing a plurality of predetermined conditions in memory, the predetermined conditions associated with a stream;
   receiving one or more messages from a plurality of user accounts participating in a chat session associated with the stream, wherein the messages are aggregated in an aggregated level of the chat session included in a display with the stream;
   detecting a section trigger in accordance with the predetermined conditions, wherein the section trigger is associated with one or more filtering attributes;
   filtering the aggregated messages based on the one or more filtering attributes, wherein a filtered subset of the aggregated messages is identified as meeting the one or more filtering attributes;
   identifying a first subset of the user accounts that originated the messages in the filtered subset;
   creating a section level associated with the chat session based on the section trigger;
   adding the identified subset of user accounts to the created section level based on the messages in the filtered subset originating from the added user accounts;
   generating an updated display that includes the stream and the section level accessible to the added user accounts, wherein the displayed section level includes one or more subsequent messages from the added user accounts; and
   generating a section action for display in the aggregated level of the stream based on an accumulated input by at least a second subset of user accounts in the created section level meeting a predetermined threshold, wherein an identifier of the created section level appears in association with the section action within the displayed aggregated level.

2. The method of claim 1, further comprising displaying a new message from one of the added user accounts in the section level accessible to the added user accounts.

3. The method of claim 2, wherein the section level allows communication of private messages among the added user accounts.

4. The method of claim 3, wherein access to the private messages is restricted to the user accounts that have been added to the created section level.

5. The method of claim 1, wherein the section level is displayed as an overlay associated with the updated display.

6. The method of claim 1, wherein the accumulated input corresponds to one or more vote totals associated with one or more section actions, wherein the section action is displayed in the aggregated level based on associated one of the vote totals meeting the predetermined threshold.

7. The method of claim 1, wherein detecting the section trigger comprises detecting that a predetermined threshold of user accounts participating in the chat session has been met.

8. The method of claim 1, wherein the filtering attributes are based on profile information associated with the user accounts participating in the chat session.

9. The method of claim 1, further comprising switching between the updated display and the display of the aggregated level.

10. A non-transitory computer-readable storage medium, having embodied thereon a program executable by a processor to perform a method for categorizing and filtering stream chats, the method comprising:
    storing a plurality of predetermined conditions in memory, the predetermined conditions associated with a stream;
    receiving one or more messages from a plurality of user accounts participating in a chat session associated with the stream, wherein the messages are aggregated in an aggregated level of the chat session included in a display with the stream;
    detecting a section trigger in accordance with the predetermined conditions, wherein the section trigger is associated with one or more filtering attributes;
    filtering the aggregated messages based on the one or more filtering attributes, wherein a filtered subset of the aggregated messages is identified as meeting the one or more filtering attributes;
    identifying a first subset of the user accounts that originated the messages in the filtered subset;
    creating a section level associated with the chat session based on the section trigger;
    adding the identified subset of user accounts to the created section level based on the messages in the filtered subset originating from the added user accounts;
    generating an updated display that includes the stream and the section level accessible to the added user accounts, wherein the displayed section level includes one or more subsequent messages from the added user accounts; and
    generating a section action for display in the aggregated level of the stream based on an accumulated input by at least a second subset of user accounts in the created section level meeting a predetermined threshold, wherein an identifier of the created section level appears in association with the section action within the displayed aggregated level.

11. The non-transitory computer-readable storage medium of claim 10, further comprising instructions executable to display a new message from one of the added user accounts in the section level accessible to the added user accounts.

12. The non-transitory computer-readable storage medium of claim 11, wherein the section level allows communication of private messages among the added user accounts.

13. The non-transitory computer-readable storage medium of claim 12, wherein access to the private messages is restricted to the user accounts that have been added to the created section level.

14. The non-transitory computer-readable storage medium of claim 10, wherein the section level is displayed as an overlay associated with the updated display.

15. The non-transitory computer-readable storage medium of claim 10, wherein the accumulated input corresponds to one or more vote totals associated with one or more section actions, wherein the section action is displayed in the aggregated level based on associated one of the vote totals meeting the predetermined threshold.

16. The non-transitory computer-readable storage medium of claim 10, wherein detecting the section trigger comprises detecting that a predetermined threshold of user accounts participating in the chat session has been met.

17. The non-transitory computer-readable storage medium of claim 10, wherein the filtering attributes are based on profile information associated with the user accounts participating in the chat session.

18. The non-transitory computer-readable storage medium of claim 10, further comprising instructions executable to switch between the updated display and the display of the aggregated level.

19. A system for filtering stream chat messages, the system comprising:
  a memory that stores a plurality of predetermined conditions, the predetermined conditions associated with a stream;
  a network interface that receives one or more messages from a chat session associated with the stream, wherein the messages are received from a plurality of user accounts and aggregated in an aggregated level of the chat session included in a display with the stream; and
  a processor that executes instructions stored in the memory, wherein execution of the instructions by the processor:
    detects a section trigger in accordance with the predetermined conditions, wherein the section trigger is associated with one or more filtering attributes;
    filters the aggregated messages based on the one or more filtering attributes, wherein a filtered subset of the aggregated messages is identified as meeting the one or more filtering attributes;
    identifies a first subset of the user accounts that originated the messages in the filtered subset;
    creates a section level associated with the chat session based on the section trigger;
    adds the identified subset of user accounts to the created section level based on the messages in the filtered subset originating from the added user accounts;
    generates an updated display that includes the stream and the section level accessible to the added user accounts, wherein the displayed section level includes one or more subsequent messages from the added user accounts; and
    generates a section action for display in the aggregated level of the stream based on an accumulated input by at least a second subset of user accounts in the created section level meeting a predetermined threshold, wherein an identifier of the created section level appears in association with the section action within the displayed aggregated level.

20. The system of claim 19, wherein the section level further displays a new message from one of the added user accounts, wherein the section level is accessible to the added user accounts.

21. The system of claim 20, wherein the section level allows communication of private messages with the added user accounts.

22. The system of claim 21, wherein access to the private messages is restricted to the user accounts that have been added to the created section level.

23. The system of claim 19, wherein the section level is displayed as an overlay associated with the updated display.

24. The system of claim 19, wherein the accumulated input corresponds to one or more vote totals associated with one or more section actions, wherein the section action is displayed in the aggregated level based on associated one of the vote totals meeting the predetermined threshold.

25. The system of claim 19, wherein the processor detects the section trigger by detecting that a predetermined threshold of user accounts participating in the chat session has been met.

26. The system of claim 19, wherein the filtering attributes are based on profile information associated with the user accounts participating in the chat session.

27. The system of claim 19, wherein the processor further switches between the updated display and the display of the aggregated level.

\* \* \* \* \*